United States Patent
Blanchette et al.

(10) Patent No.: US 6,497,822 B2
(45) Date of Patent: Dec. 24, 2002

(54) CHEMICAL FEEDER

(75) Inventors: David W. Blanchette, Southington, CT (US); Christopher M. Zetena, Atlanta, GA (US); Michael Paloian, Cold Spring Harbor, NY (US); G. Warren Ginn, Glen Cove, NY (US)

(73) Assignee: Arch Chemicals, Inc., Norwalk, CT (US)

( * ) Notice: Subject to any disclaimer, the term of this patent is extended or adjusted under 35 U.S.C. 154(b) by 0 days.

(21) Appl. No.: 09/915,859

(22) Filed: Jul. 26, 2001

(65) Prior Publication Data

US 2002/0011436 A1 Jan. 31, 2002

Related U.S. Application Data

(60) Provisional application No. 60/221,289, filed on Jul. 27, 2000, and provisional application No. 60/259,886, filed on Jan. 5, 2001.

(51) Int. Cl.⁷ .................................................. C02F 1/00
(52) U.S. Cl. ........................ 210/754; 210/169; 210/205; 210/206; 210/232
(58) Field of Search ................................ 210/754, 169, 210/205, 206, 232

(56) References Cited

U.S. PATENT DOCUMENTS

| | | |
|---|---|---|
| 4,006,888 A | 2/1977 | Emmons |
| 4,208,376 A | 6/1980 | Sangster et al. |
| 4,519,914 A | 5/1985 | Etani |
| 4,530,120 A | 7/1985 | Etani |
| D297,857 S | 9/1988 | Alexander et al. |
| 4,769,137 A | 9/1988 | Powell, Jr. |
| 4,790,981 A | 12/1988 | Mayer et al. |
| 4,917,868 A | 4/1990 | Alexander et al. |
| 4,923,618 A | 5/1990 | Casberg et al. |
| D309,493 S | 7/1990 | Casberg |

(List continued on next page.)

FOREIGN PATENT DOCUMENTS

WO  00/19165  1/2001

OTHER PUBLICATIONS

G–7500 Automatic Granular Chlorinator System, Installation Instructions, Polaris Watermatic, Vista Way, California, Sep., 1999.
G–1000 Product Manual, Polaris Watermatic, Vista Way, California, Feb., 2000.
Pro System C–1, Product Adverstisement, Polaris Watermatic, Vista Way, California, Jan., 2000
The Pulsar III System, *http://www.archwaterworks.com/commercial/pulsar3.htm*, printed Jun. 26, 2000.
The Pulsar III Model PS 5000 Parts Diagram, *http://www.archwaterworks.com/commercial/chlroinator3–partsdiagram.htm*, printed Jun. 26, 2000.
The Pulsar III Model PS 5000 Parts List, *http://www.archwaterworks.com/commerical/chlorinator3–partslist.htm*, printed Jun. 26, 2000.

Primary Examiner—Betsey Morrison Hoey
(74) Attorney, Agent, or Firm—Wiggin & Dana LLP; William B. Slate

(57) ABSTRACT

A feeder uses vortex flow to facilitate the dissolving of a chlorine-containing water treatment chemical. A feeder inlet receives water which is directed to a chamber by a conduit. A vortex flow in the chamber receives amounts of the chemical from a reservoir. Chlorine-containing water exits through an outlet.

31 Claims, 17 Drawing Sheets

U.S. PATENT DOCUMENTS

| | | |
|---|---|---|
| 5,004,549 A | 4/1991 | Wood et al. |
| 5,019,250 A | 5/1991 | Lorenzen |
| RE33,861 E | 3/1992 | Zetena et al. |
| 5,112,521 A | 5/1992 | Mullins et al. |
| 5,133,381 A | 7/1992 | Wood et al. |
| 5,259,537 A | 11/1993 | Beers et al. |
| 5,384,102 A | 1/1995 | Ferguson et al. |
| 5,419,355 A | 5/1995 | Brennan et al. |
| 5,422,014 A | 6/1995 | Allen et al. |
| 5,427,748 A | 6/1995 | Wiedrich et al. |
| 5,441,711 A | 8/1995 | Drewery |
| 5,468,066 A | 11/1995 | Hammonds |
| 5,567,048 A | 10/1996 | Hammonds |
| 5,695,644 A | 12/1997 | Buchanan et al. |
| 5,753,100 A | 5/1998 | Lumsden |
| 5,853,304 A | 12/1998 | Marcheseault et al. |
| 5,853,579 A | 12/1998 | Rummler et al. |
| 5,906,316 A | 5/1999 | Gatzmeyer et al. |
| 5,928,608 A | 7/1999 | Levesque et al. |
| 5,932,093 A | 8/1999 | Chulick |
| 6,045,706 A | 4/2000 | Morrison et al. |
| 6,228,273 B1 | 5/2001 | Hammonds |
| 6,337,024 B1 | 1/2002 | Hammonds |

CHEMICAL FEEDER

CROSS-REFERENCE TO RELATED APPLICATIONS

Priority is claimed to U.S. Provisional Patent Applications Ser. Nos. 60/221,289 and 60/259,886 entitled "Dissolving Chamber for a Chlorinator" filed Jul. 27, 2000 and Jan. 5, 2001, respectively, the disclosures of which are incorporated by reference herein.

BACKGROUND OF THE INVENTION (1) Field of the Invention

This invention relates to water treatment, and more particularly to feeders for introducing treatment chemicals into a recirculating water stream from a swimming pool or the like.

(2) Brief Description of the Art

If untreated, swimming pool water provides an hospitable forum for the growth of bacteria, algae, and other undesirable and potentially unhealthful organisms. It, accordingly, has become common practice to treat pool water on both periodic and continuous bases with treatment chemicals to kill/control such organisms.

Such treatment is typically undertaken via the introduction of chlorine into the pool water at levels effective to kill or control the unwanted organisms. The chlorine source may be in liquid form or may be in a solid form which is then dissolved in the pool water. Among solid sources of chlorine are calcium hypochlorite (cal hypo), dichloroisocyanuric acid (dichlor), and trichloroisocyanuric acid (trichlor).

A variety of feeders exist to deliver chlorine from solid chemical tablets and the like. It is known to utilize a floating erosion dispenser, also known as a "floater" or "feeder", to provide a continuous release of the chemical. The floater contains the solid chemical and provides a controlled exposure of the chemical to the pool water which in turn controls the speed with which the water erodes the solid chemical to introduce chlorine to the pool water. Exemplary floaters are disclosed in U.S. Pat. No. 4,917,868 and U.S. Design Pat. Nos. 297,857 and 309,493. It is also known to pump pool water through an external feeder which may be incorporated in a circulation system that also provides filtering of the pool water. Among such systems are intermittent spray systems, erosion systems, and partial periodic immersion systems. Examples of such systems are shown in U.S. Pat. Nos. 5,932,093, 5,928,608, 5,441,711, 5,427,748, 5,419,355, 5,384,102, 5,133,381, and 4,208,376, and U.S. Reissue Pat. No. 33,861. As additional background, U.S. Pat. Nos. 5,112,521 and 5,004,549 disclose various solid calcium hypochlorite compositions.

Obtaining proper dissolution of the treatment chemical and avoiding undesirable deposits or residues have posed problems in feeder design. Particular problems exist with the use of commercial calcium hypochlorite pellets which produce calcium carbonate deposits. See e.g., U.S. Pat. No. 6,045,706.

BRIEF SUMMARY OF THE INVENTION

The introduction of treatment chemical to a vortex flow can encourage the dissolution of such chemical via mechanisms which may include the physical agitation provided by the flow and the increased time available for dissolving provided by the flow. The ability to have a relatively continuous flow of water with a more intermittent introduction of chemical may help resist formation of deposits and may provide for a less complex, more economical, feeder construction. Deposits can further be minimized via the introduction of appropriate jets of fresh water at strategic locations where buildup might otherwise occur.

Accordingly, in one aspect the invention is directed to a device for introducing a chemical into a flow of water and having first and second chambers. At least the first nozzle directs water from the flow into the first chamber so as to produce a vortex flow of a body of water in the first chamber. A surface separates the first chamber from the second chamber and defines an outlet for overflow from the first chamber to the second chamber. A second chamber outlet directs water from the second chamber. A reservoir of the chemical has a reservoir outlet positioned to direct the chemical from the reservoir into the body of water in the first chamber. The dissolving of the chemical in the water in the body is encouraged by the vortex flow and the water containing the dissolved chemical is evacuated through the second chamber outlet.

In various implementations of the invention, a second nozzle may direct water from the flow toward a bottom of the first chamber so as to provide a flushing action at the first chamber bottom. A third nozzle bypassing the first chamber may direct additional water from the flow toward the second chamber outlet so as to provide a flushing action at the second chamber outlet. A first float valve may control flow through the first, second and third nozzles and may be positioned to restrict flow when a second chamber water level exceeds a first height. A second float valve may control flow through the second chamber outlet and be positioned to restrict flow when the second chamber water level falls below a second height, lower than the first height. The first, second and third nozzles may be formed as flat fans nozzles. The first and second nozzles may be fed by a common conduit extending along the majority of flow length from the first float valve to the first and second nozzles. The surface may be formed as a reduced height portion of a rim of a wall separating the first chamber from the second chamber. The first nozzle may direct water substantially tangential to an inner surface of the wall. The chemical may consist essentially of calcium hypochloride, dichlorocyanuric acid, trichlorocyanuric acid, or combinations thereof. The water flow may be recirculating flow to/from a swimming pool and the chemical may consist essentially of granular calcium hypochlorite. The first nozzle may have dimensions effective to carry a water flow rate of between 0.2 gpm and 1.0 gpm (0.8 and 3.8 liters/minute), and more preferably between 0.6 gpm and 0.9 gpm (2.3 and 3.40 liters/minute), at 40 psi (0.28 MPa).

The feeder may be incorporated in a pool water treatment system along with at least one pump, a filter, and a conduit network coupling the feeder, pump, and filter to a swimming pool for filtering and chlorinating a recirculating flow of water to/from the pool.

Another aspect of the invention is directed to a device for introducing chlorine from a chlorine-containing pool treatment chemical into a flow of water to/from a swimming pool. An inlet received water from the flow and a nozzle directs received water into a chamber so as to produce a vortex flow of a body of water in the chamber. An opening above the vortex flow receives amounts of the treatment chemical from a reservoir. An outlet returns chlorine-containing water to the flow.

Another aspect of the invention relates to a method for introducing treatment chemical into a body of water at a controlled rate. A feeder is provided having an inlet and an outlet and containing a solid chemical in a chemical reservoir. A flow of water from the body is caused to enter the feeder through the inlet and exit through the outlet to return to the body. A vortex of the water is introduced in a chamber of the feeder. The chemical is dispensed from the reservoir into the vortex. The dispensed chemical is permitted to dissolve in the water in the vortex. The combined flow of water and dissolved chemical is directed from the chamber to the outlet.

In various implementations, the directing may comprise permitting an overflow of water and dissolved chemical from the vortex into a second chamber and passing the overflow to the outlet. Water may be passed from a flow through a conduit bypass in the first chamber so as to provide a flushing action at an outlet of the second chamber, optionally coincident with the feeder outlet. The overflow may represent between 50 and 90% of a total overflow through the feeder. Dispensing may occur at a regular interval. The flow may be continuous and the dispensing may be intermittent. The vortex may be produced by introducing at least a portion of the flow to the chamber with a tangential velocity component of at least 30 fps at a location at least 1 inch from a central axis of the chamber.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
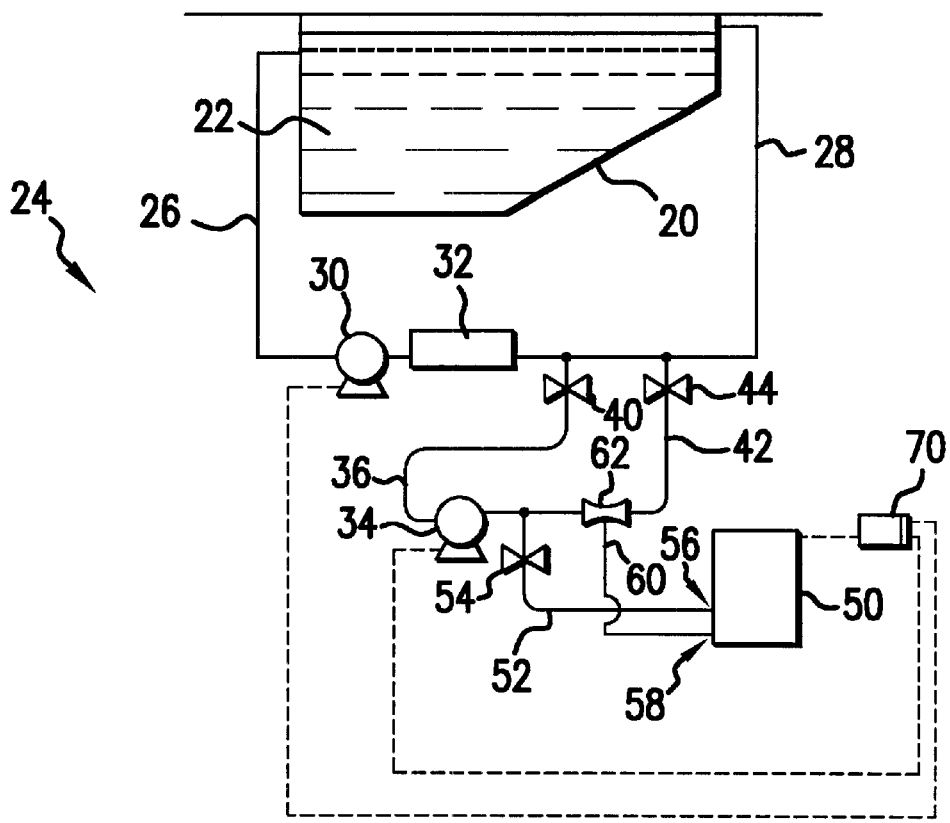
FIG. 1 is a diagram of an exemplary pool circulation system.

FIG. 1 shows a pool 20 containing a body 22 of pool water and associated with a circulation system 24. The circulation system has a pool outlet conduit 26 drawing water from the pool and a pool return conduit 28 returning water to the pool. Flow through these conduits is induced by a pump 30 with a low pressure (suction) side toward the pool outlet conduit and a high pressure side toward the pool return conduit. Downstream of the pump, a system filter 32 may be provided to filter debris and the like from water flowing from the pump. Therefore, the primary recirculating flow path from/to the body 22 includes the pool outlet conduit 26, pump 30, filter 32, and pool return conduit 28.

A secondary flow path is formed as a diversion of water from the primary flow path. A pool chemical feeder may be placed directly in the secondary flow path or may be placed in a further diversion therefrom. In the illustrated example, a booster pump 34 is coupled by a pump inlet line 36 to the pool return conduit 28 via a tee fitting or junction. A valve 40 (e.g., a user-actuated valve such as a 1.5 inch (38 mm) ball valve) is located within the conduit 36 to selectively block and unblock flow through that conduit. A pump outlet conduit 42 returns water from the pump 34 to the pool return conduit 28 at a tee fitting downstream of that of the inlet conduit 36. A valve 44 which may be similar to the valve 40, controls flow through the outlet conduit 42 proximate the return conduit 28.

A tertiary flow path is formed as a diversion of water from the secondary flow path through a pool chemical feeder 50. The feeder 50 introduces a desired treatment chemical to the water flowing in the tertiary flow path and, therefrom, to the secondary and primary flow paths and thus to the body 22. In the tertiary recirculating flow path, a feeder inlet conduit 52 has an upstream end joining the pump outlet conduit 42 at a tee fitting. A valve 54 (e.g., a 0.5 inch (13 mm) ball valve) is located within the conduit 52 to selectively block and unblock flow through that conduit. A downstream end of the conduit 52 may connect to the feeder 50 at a feeder inlet port 56.

At a feeder outlet port 58, at the downstream end of the feeder, there is a feeder return conduit 60. To draw water through the feeder, the conduit 60 is subjected to a lower pressure (e.g., a vacuum) than the conduit 52. In this exemplary embodiment, the downstream end of the conduit 58 is coupled to a vacuum pump 62 formed as a flow restriction, such as a venturi, located in the pump outlet conduit 42 downstream of the feeder inlet conduit 52. The combination of booster and vacuum pumps serves to provide a desired pressure difference across the feeder (inlet to outlet). The inlet is preferably between about 10 and about 40 psi (0.07 and 0.28 MPa) and, more preferably, between about 30 and about 40 psi (0.21 and 0.28 MPa) above atmospheric pressure. The outlet is advantageously at a vacuum of 2–29 inches (5–74 cm) of mercury.

An electronic control module (controller) 70 may be coupled to the feeder, to the pump(s) and other system components such as valves to control operation of the system or key portions thereof. The controller may incorporate timer circuitry or programming and/or may incorporate complex functions such as might be necessary to operate in response to inputs from a variety of sensors.

Figure 2:
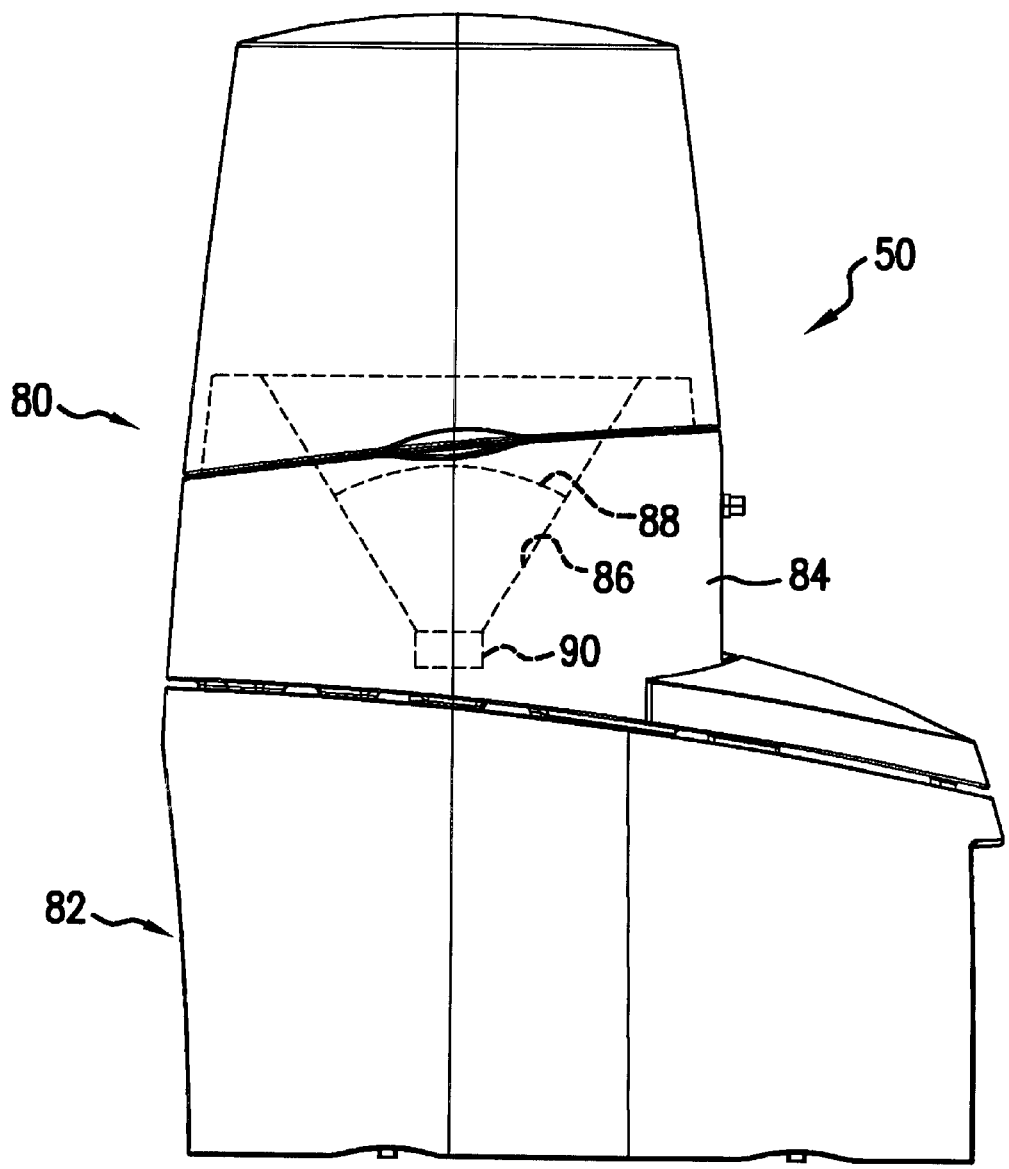
FIG. 2 is a side view of a feeder.

The feeder 50 (FIG. 2) includes an upper dispensing portion 80 above a lower dissolving portion 82. The dispensing portion may include a hopper 84 having a frustoconical interior wall portion 86 and containing a granular source of chlorine 88. A solenoid-controlled valve 90 coupled to the controller may provide for precise periodic metering of the granules from the hopper to the dissolving portion. A number of hopper constructions are known in the art or may be developed. Exemplary hopper constructions are found in the Polaris Watermatic G1000 and G7500 chlorinators of Polaris Watermatic, Vista, Calif. and are disclosed in U.S. Pat. No. 5,019,250 of Lorenzen, the disclosure of which is incorporated herein by reference in its entirety. Exemplary granules are 65% calcium hypochlorite granular available from Arch Chemicals, Inc., Charleston, Tenn. A key advantage of granular material is that it will typically be less expensive to manufacture than tableted material. An exemplary delivery rate involves a shot size of 2 to 5 ounces (57 to 142 grams) at a five minute interval for a pool in the vicinity of 20,000–200,000 gallons (76,000–760,000 liters). This interval is effective to allow substantially complete dissolving of each shot.

Figure 3:
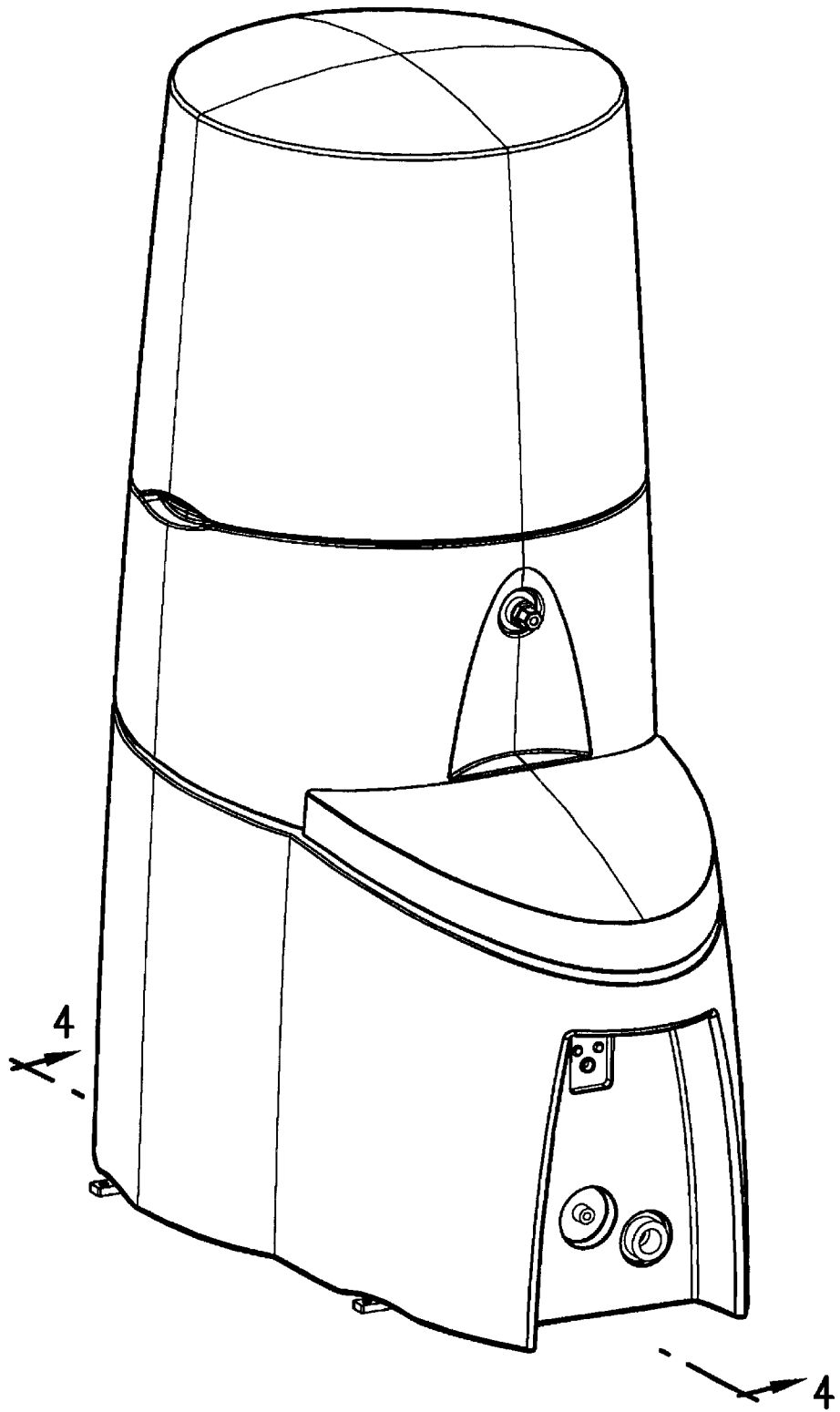
FIG. 3 is a perspective view of the feeder of FIG. 2.
Figure 4:
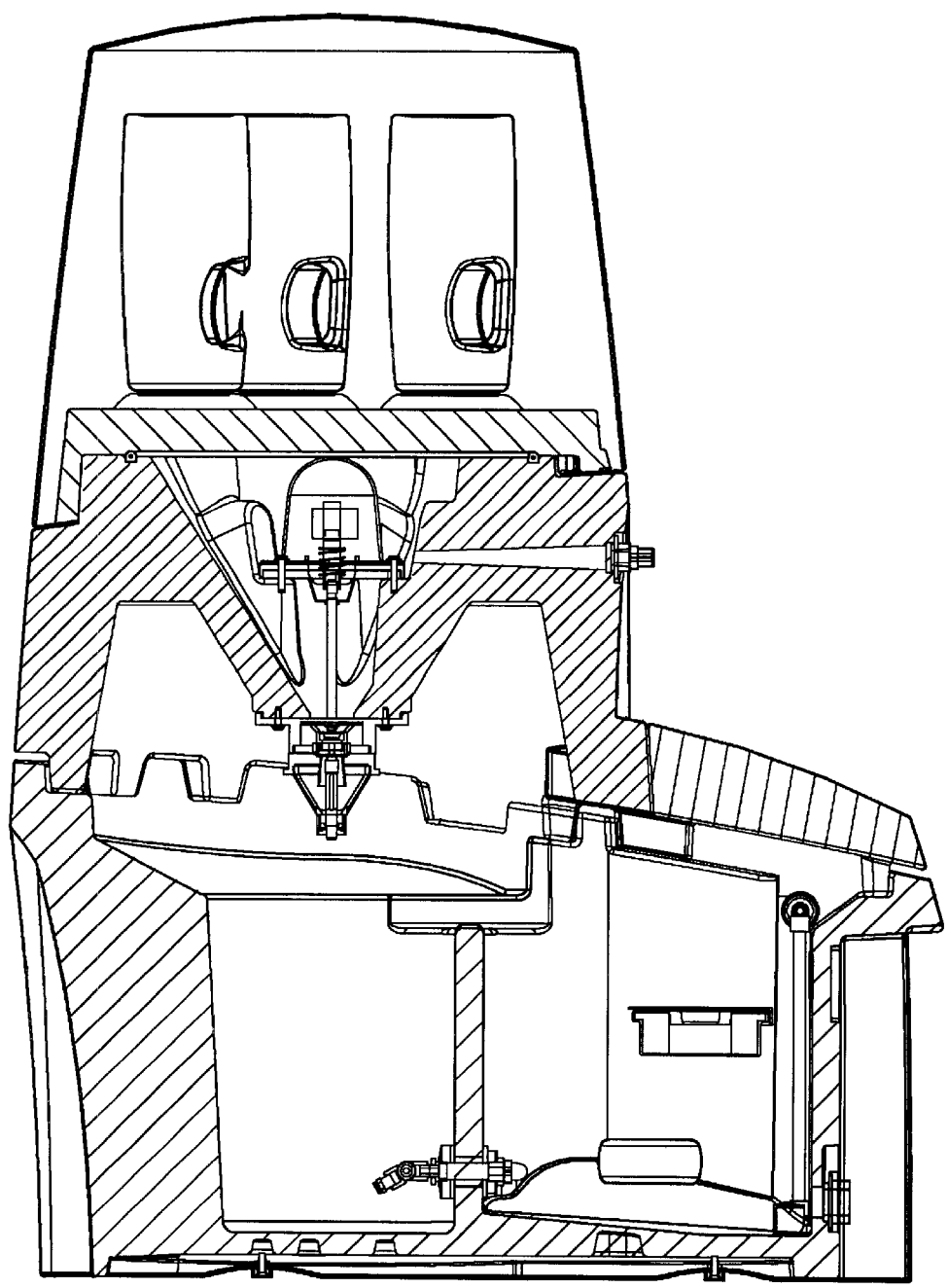
FIG. 4 is a central longitudinal sectional view of the feeder of FIGS. 2 and 3, taken along line 4—4 of FIG. 3.

FIGS. 3 and 4 and the subsequent detailed views show additional features of the exemplary feeder. For purposes of illustration, a number of principal structural portions of the feeder are shown sectioned as if molded as thick-walled products. However, commercial products are preferably molded to produce thin walls via techniques such as rotomolding. The views may also reflect other artifacts of the particular CAD process used to generate the drawings and of various engineering simplifications, none of which would affect the disclosure to one of ordinary skill in the art.

Figure 5:
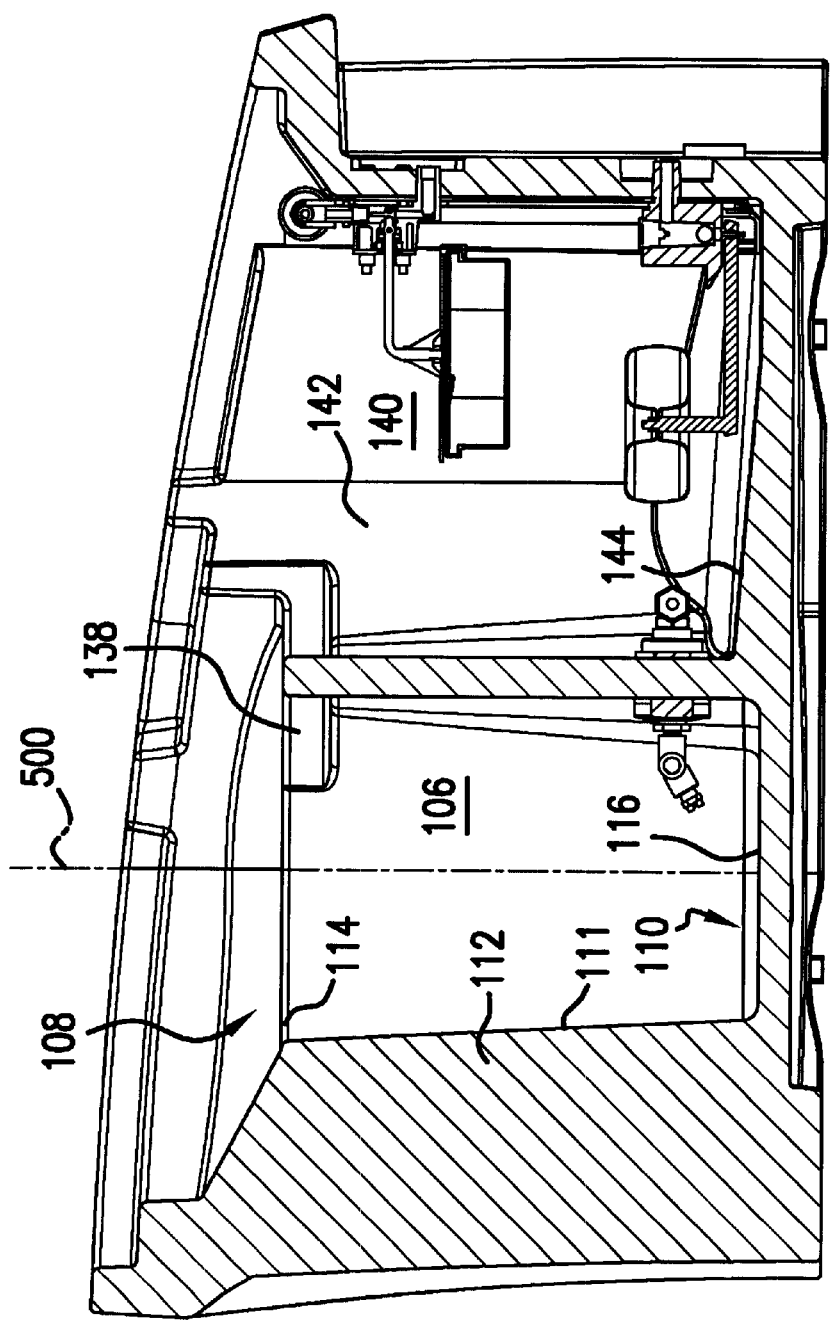
FIG. 5 is a central longitudinal sectional view of a dissolving portion of the feeder of FIG. 4.
Figure 6:
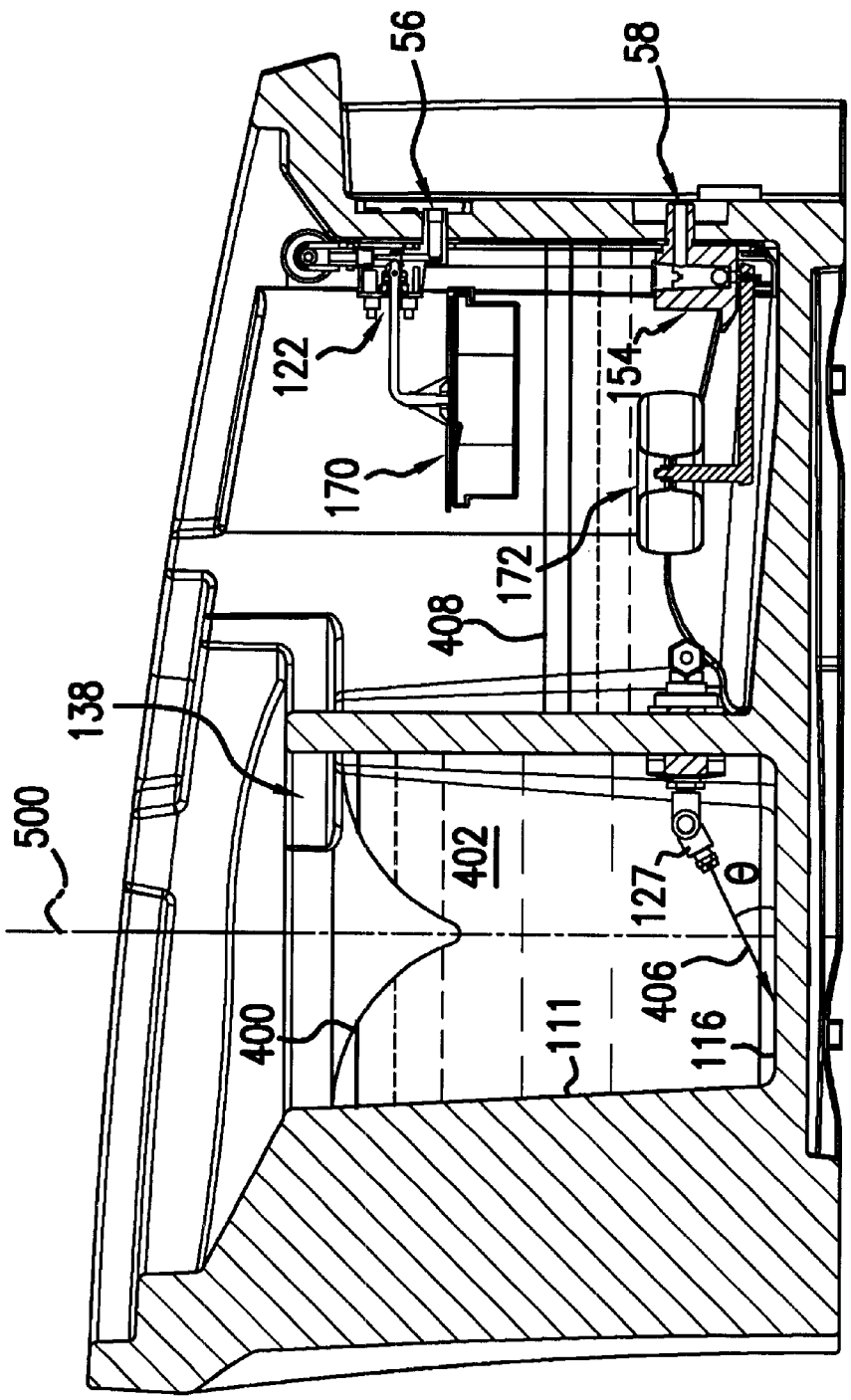
FIG. 6 is a view of the dissolving portion of FIG. 5 showing water levels.
Figure 7:
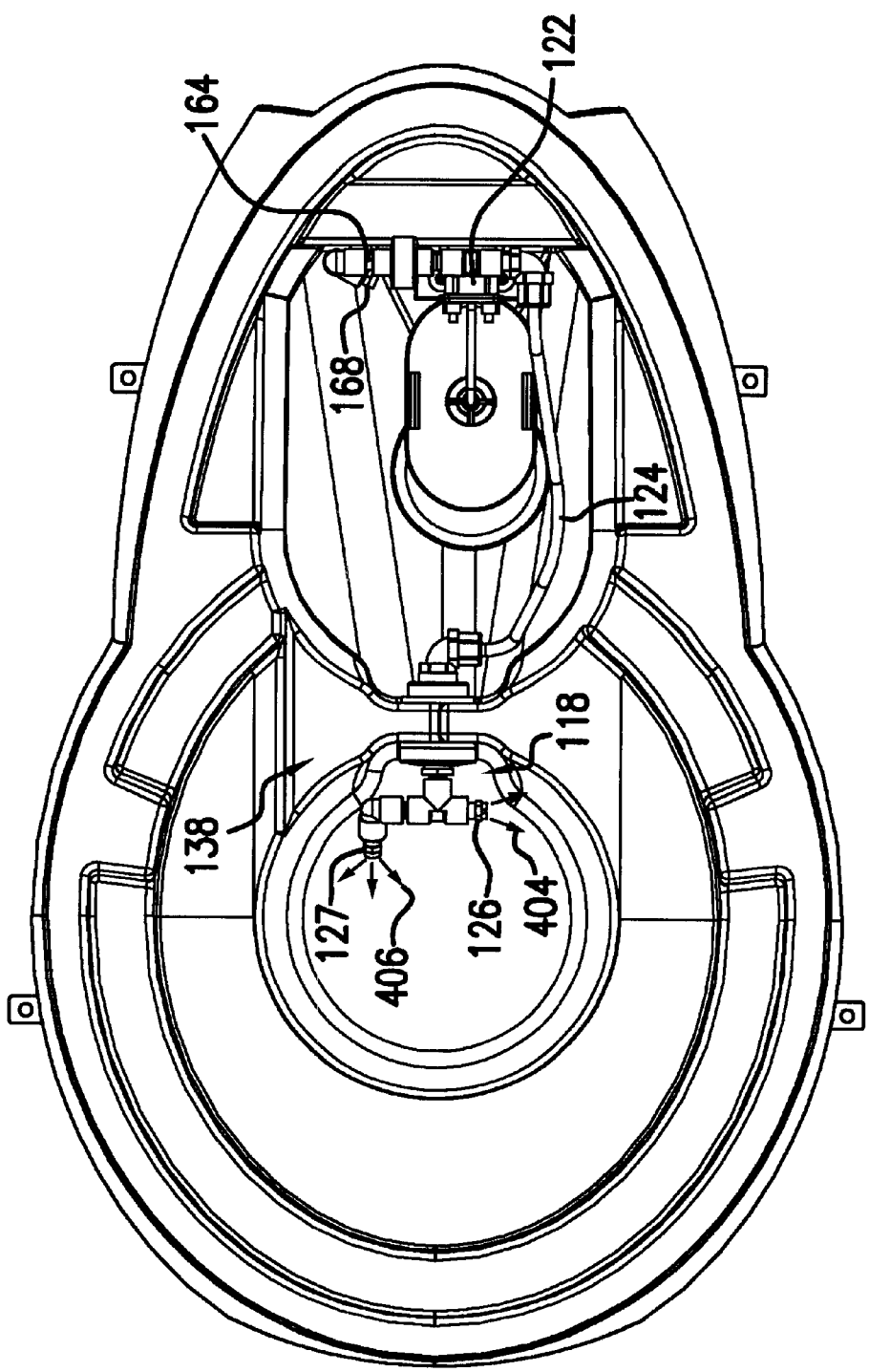
FIG. 7 is a top view of the dissolving portion of FIG. 5.

The exemplary dissolving portion 82 (FIG. 5) comprises a molded body (e.g., of LLDPE), which defines a pair of chambers. A first or dissolving chamber 106 having a substantially open upper end 108 and a substantially closed lower end 110. The chamber is formed by an interior lateral surface 111 of a wall 112 which extends from an upper rim 114 to a lower extremity defined by a bottom wall flat upper surface 116. The chamber 106 has a central vertical axis 500. Around a major portion of the chamber from the surface 116 upward to a surface 400 (FIG. 6) of the water 402 within the chamber, the wall surface 111 is centered about the axis 500. Over a portion of the circumferential span of the wall surface 111, there is advantageously a vertically-extending depressed surface area 138 (FIG. 7). The remaining concentric portion of the exemplary surface 111 is preferably formed as a shallow downwardly tapering frustoconical surface.

For admitting water to the feeder, the feeder inlet 56 (FIG. 6) is coupled via a valve 122 (FIG. 7) to a conduit network. A first conduit branch 124 (FIG. 7 only) terminates in nozzles 126 and 127 in the dissolving chamber. The first nozzle 126 is positioned and oriented to provide a fan 404 of water tangentially along the inner surface 111 of the wall 112. For example, the fan 404 is advantageously oriented within about 10° of tangential. In operation, water accumulates in the dissolving chamber so that the tangential flow from the first nozzle produces a vortex flow of the accumulated water. The vortex flow centrally depresses the surface 400 (FIG. 6) of the body of water 402 in the chamber while relatively elevating the perimeter of such surface along the wall surface 111. The exemplary vortex moves clockwise when viewed from above although the opposite is equally useful. The second nozzle 127 is directed more radially and/or longitudinally than tangentially and produces a smaller (if any) contribution to the vorticity than does the first nozzle. The second nozzle is directed radially inward and longitudinally downward toward the bottom wall upper surface 116 at an exemplary angle of incidence θ (FIG. 6) of between 15° and 30° (preferably about 20°). A primary function of the second nozzle is to produce a flow 406 for scouring the bottom of the chamber to prevent residue buildup. The second nozzle may be oriented to slightly oppose the circulation achieved by the first nozzle. The first and second nozzles may be separately formed from the more proximal portions of the conduit branch 124 feeding them. Exemplary first and second nozzles are flat fan nozzles providing fan angles of between about 50° and about 80° with the first nozzle advantageously having a somewhat higher flow rate than the second. Exemplary commercial nozzles are available from Lechler, Inc., St. Charles, Ill. as model nos. 632.564.5E.BC and 632.364.5E.BC, respectively. These exemplary nozzles have respective flow rates of 0.78 and 0.2 gpm (2.9 and 0.76 liters/minute) at 40 psi (0.28 MPa).

Advantageously, overflow from the dissolving chamber is confined to a limited sector of the wall 112. This may be achieved via discrete apertures in the wall 112 or via providing the rim 114 with the relatively low portion 138 along the desired overflow sector. Overflow from the dissolving chamber is into a second or outlet chamber 140 (FIG. 5) defined by wall surface 142 and upward facing bottom surface 144.

The feeder outlet 58 (FIG. 6) is placed in communication with the second chamber via a second valve 154. An additional conduit 164 (FIG. 7) terminating in a third nozzle 168 extends from the first valve 122 to a location proximate the feeder outlet. The third nozzle 168 is also advantageously a flat fan nozzle having a flow rate relatively lower than that of the first nozzle and may be identical to the second nozzle. The first and second valves are preferably respectively normally open and normally closed float valves. Their floats 170 and 172 (FIG. 6) are positioned within the second chamber. The float of the first valve is positioned at a relatively high height so that when the water level 408 in the second chamber exceeds that height the first valve restricts and preferably terminates inlet flow to the feeder to prevent overfilling. The float of the second valve is at a lower height. When the water level in the second chamber drops below the lower height, the second valve restricts or preferably terminates outlet flow to maintain a minimum water level in the second chamber.

Figure 8:
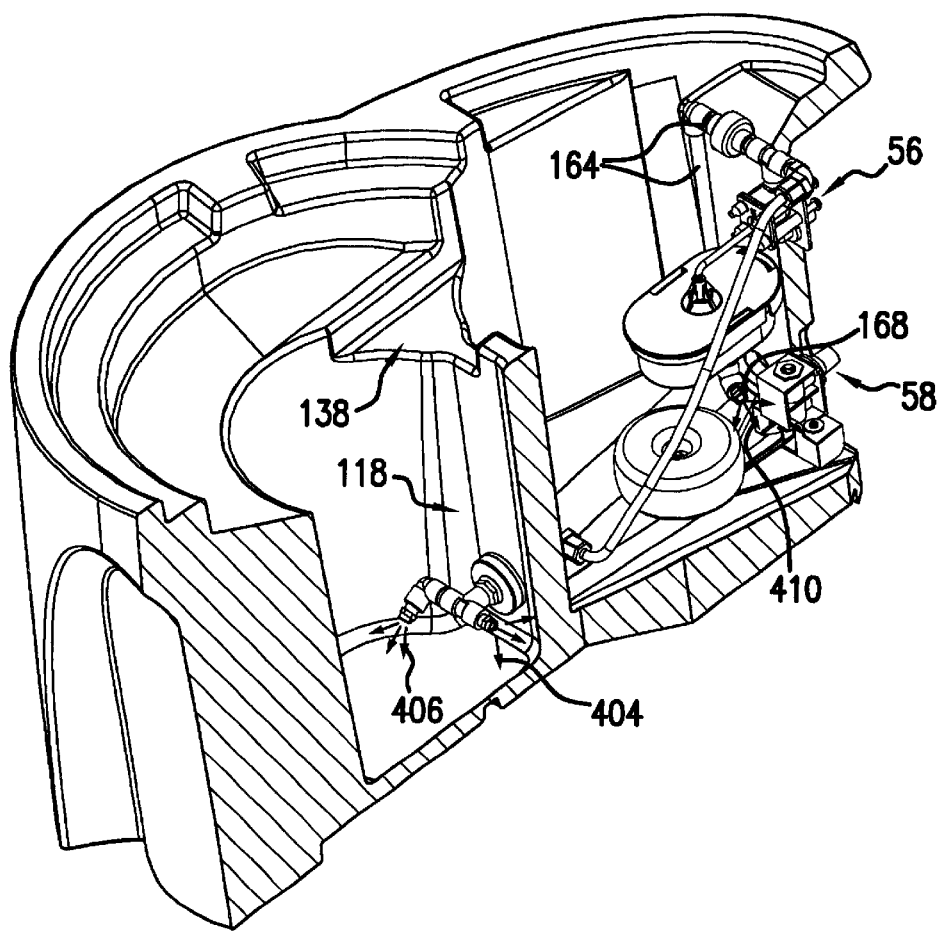
FIG. 8 is a cutaway perspective view of the dissolving portion of FIG. 5.
Figure 9:
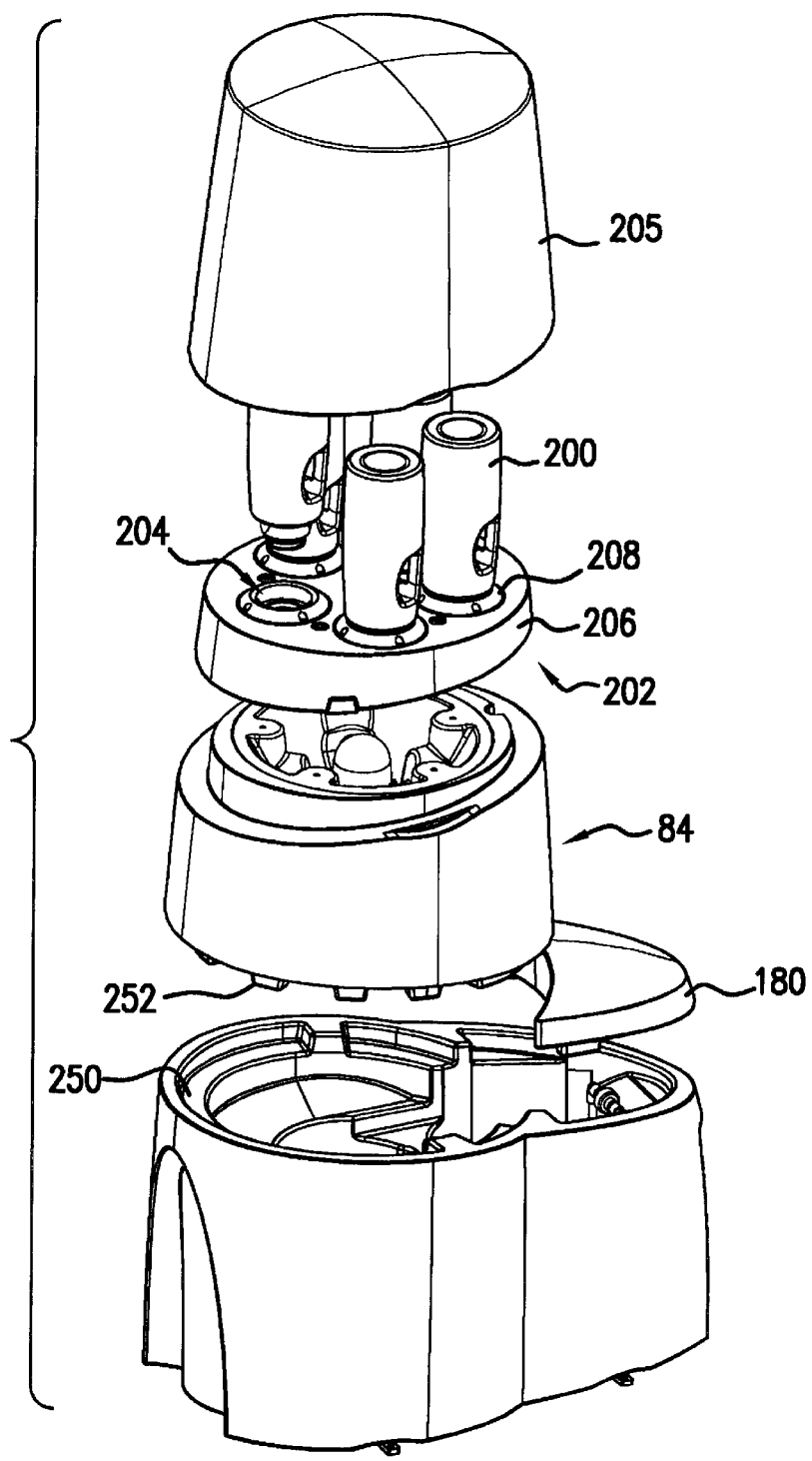
FIG. 9 is a partially exploded view of the feeder of FIG. 2.

In normal operation, there is a continuous flow of water through the feeder. At predetermined intervals or responsive to a detected need, the controller causes the dispensing portion to drop a predetermined or a calculated amount of calcium hypochlorite granules into the center of the swirling vortex in the dissolving chamber. The vortex flow facilitates dissolving of the granules. Overflow from the dissolving chamber at the rim portion/outlet 138 goes down along the surface 142 into the second chamber. At this point, the overflow is joined by flow 410 (FIG. 8) through the conduit 164 which has bypassed the dissolving chamber. This outlet flow 410 from the third nozzle 168 is directed to provide a scouring action at the downstream end of the second chamber to prevent accumulation of deposits and/or undissolved granules. In the second chamber, the flow through the third nozzle joins the overflow and the combined flow then is permitted to exit the feeder outlet via the second valve 154. Advantageously, the water in the second chamber has relatively little vorticity as such vorticity might interfere with the proper long-term operation of the float valves. Thus, although the second chamber may be substantially circular in its horizontal section, it is particularly amenable to having varied configurations. An outlet chamber cover 180 (FIG. 9) may be provided separate from or integrated with the hopper 84.

Figure 10:
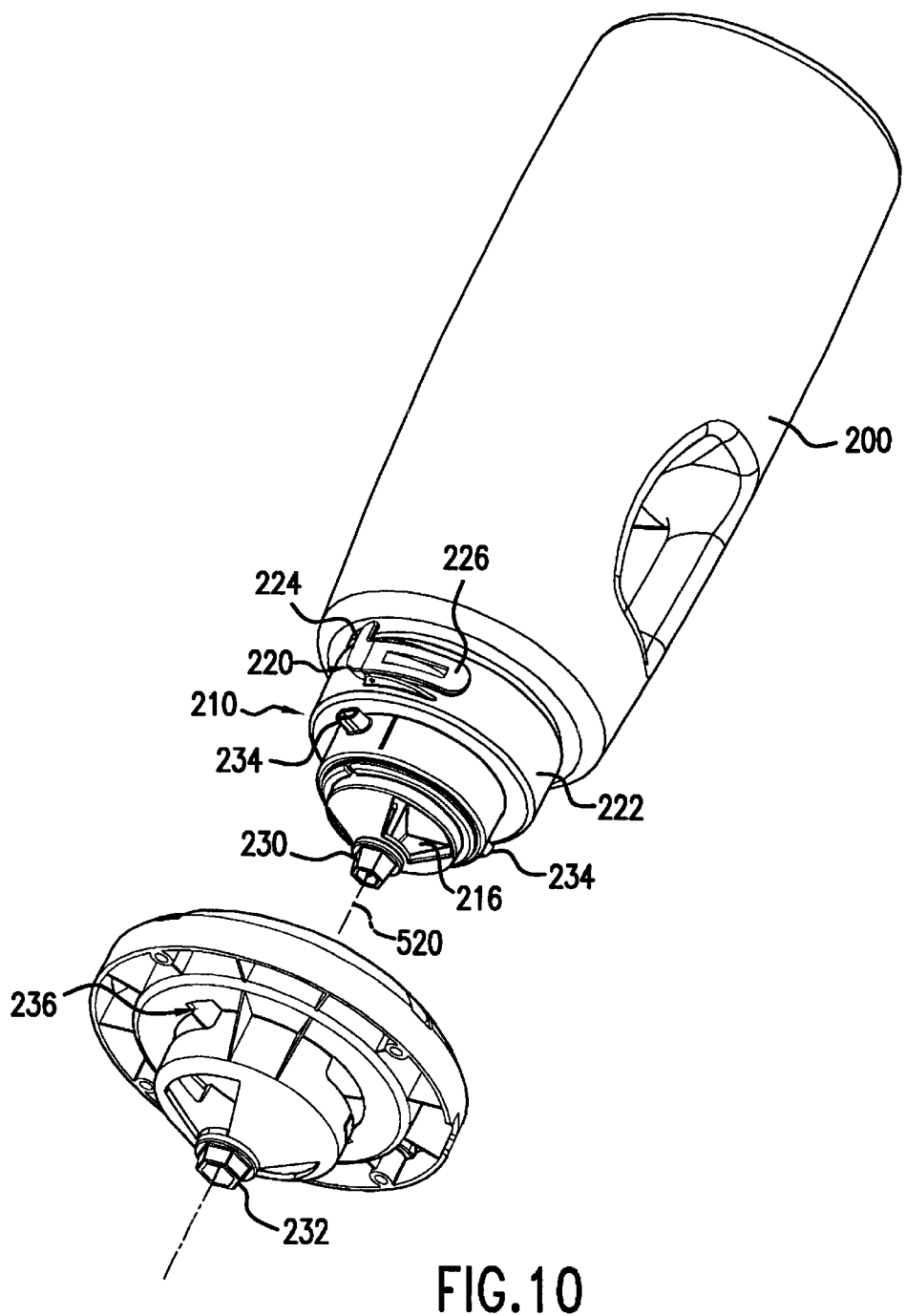
FIG. 10 is a view of a chemical bottle of the feeder of FIG. 2 shown relative to a receptacle insert in an initial pre-installation position and orientation.
Figure 11:
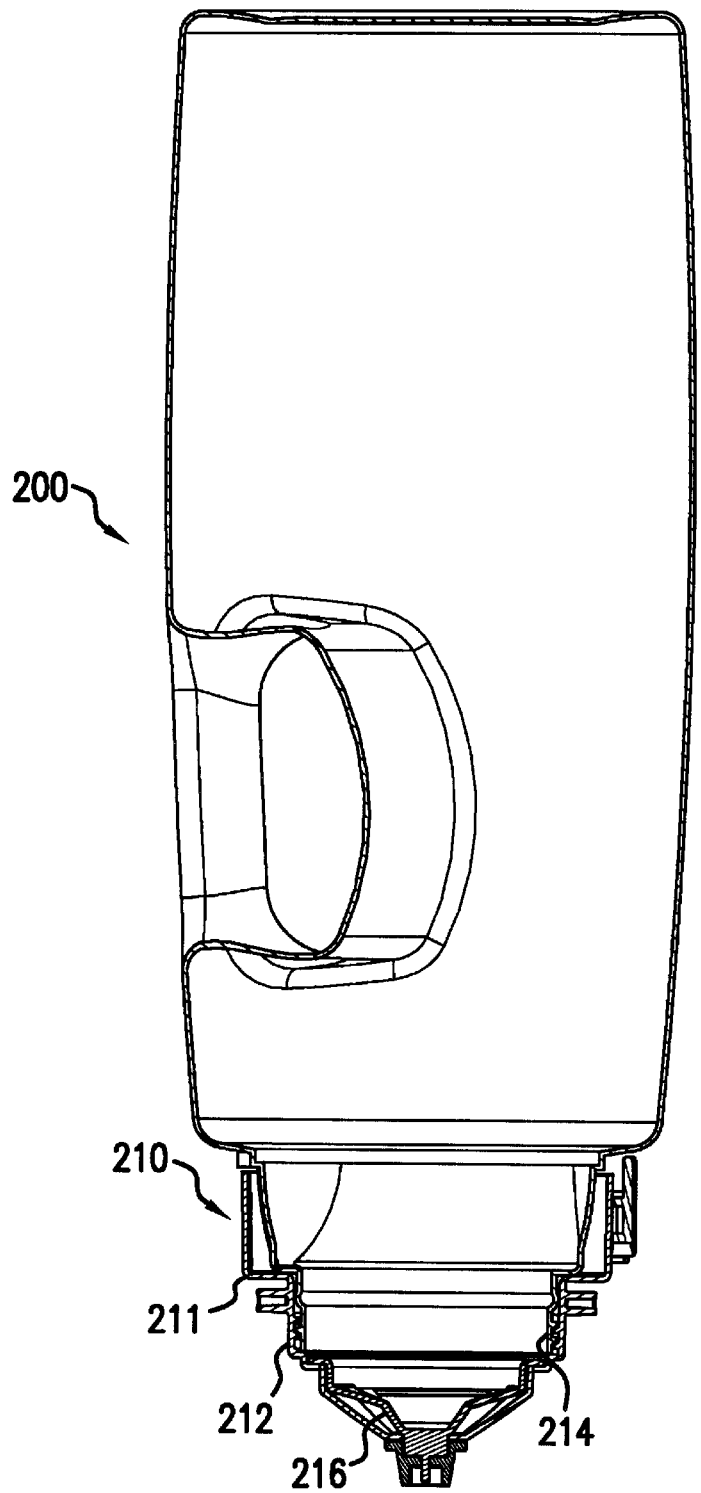
FIG. 11 is a central longitudinal section of the bottle of FIG. 10.
Figure 12:
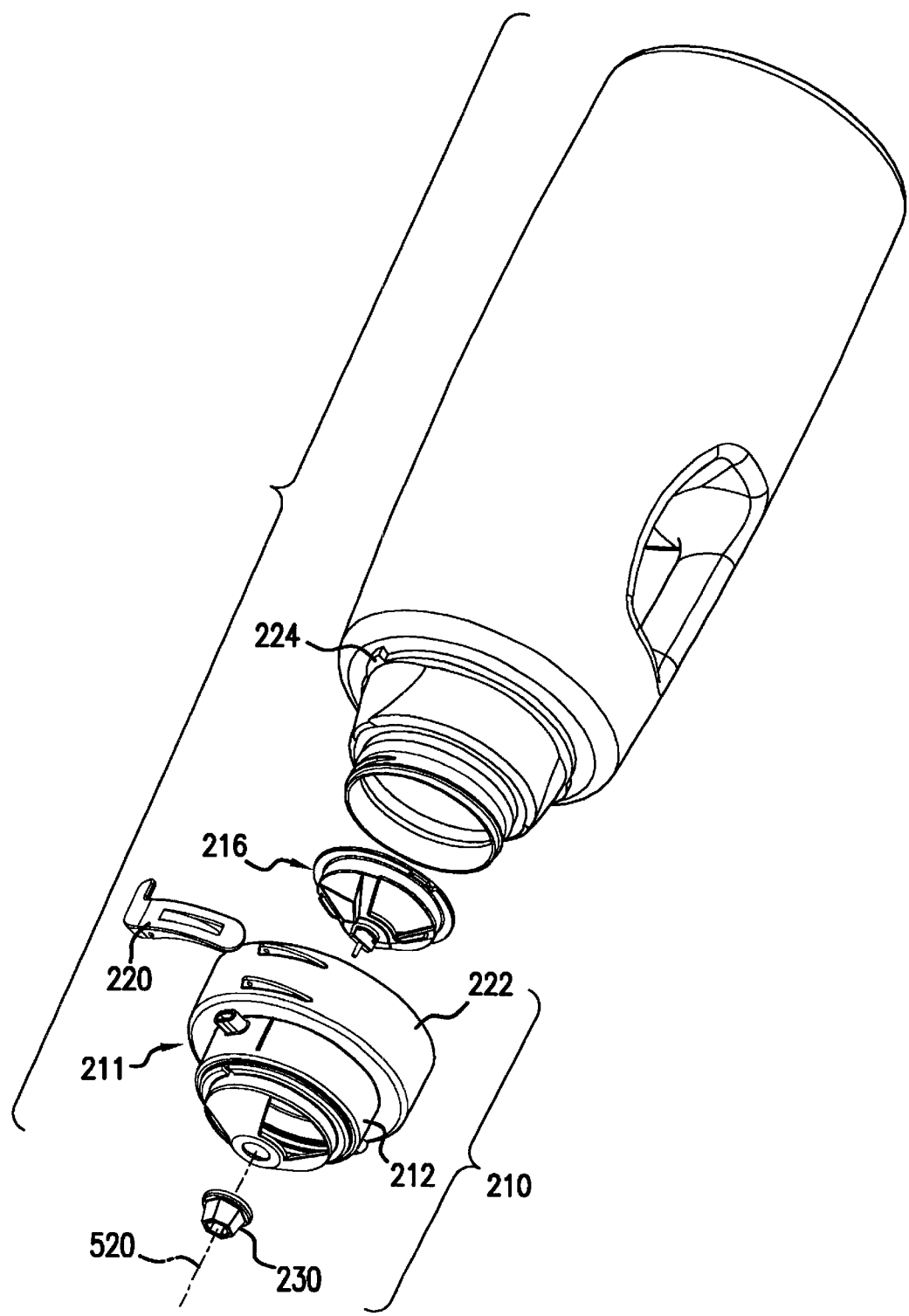
FIG. 12 is an exploded view of the bottle of FIGS. 10 and 11.

In the exemplary embodiment, the hopper 84 (FIG. 9) receives the granules from a plurality of bottles 200 which may be inverted and installed on a hopper cover element 202. For cleanliness and concealment, the installed bottles may in turn be covered by a separate cover 205. To this end, the cover 202 is provided with a number of receptacles 204 (e.g., five in the exemplary embodiment) at equal distances from a central axis of the hopper. The exemplary cover 202 comprises a primary molded (e.g., rotomolded) member 206 with separate inserts 208 secured to the primary member such as by screws and defining the receptacles. The exemplary bottles are molded of plastic (e.g., HDPE) and include integral handles. The exemplary bottles are advantageously sold with disposable screw-on covers (not shown) which may be removed prior to installation. To permit inversion of the uncovered bottle, an adapter 210 (FIG. 10) is provided with a body 211 (FIG. 11) having an internally threaded portion 212 to screw onto the externally threaded bottle mouth 214. An exemplary adapter includes a rotary gate valve with a partially frustoconical gate 216.

The adapter is initially installed on the bottle with the gate closed (FIG. 10) permitting the bottle to be inverted. Specifically, as the adapter body is screwed on to the bottle mouth, a self sprung latch 220 on a collar portion 222 of the body will snap over a ramp-like projection 224 proximate a bottle shoulder and lock against the trailing edge of the projection to lock the adapter body to the body against relative rotation about a bottle/adapter axis 520. Ultimately, when the bottle is spent, the two may be decoupled by manually flexing the latch 220 via a lever end 226 to permit its operative end to pass over the projection.

Figure 13:
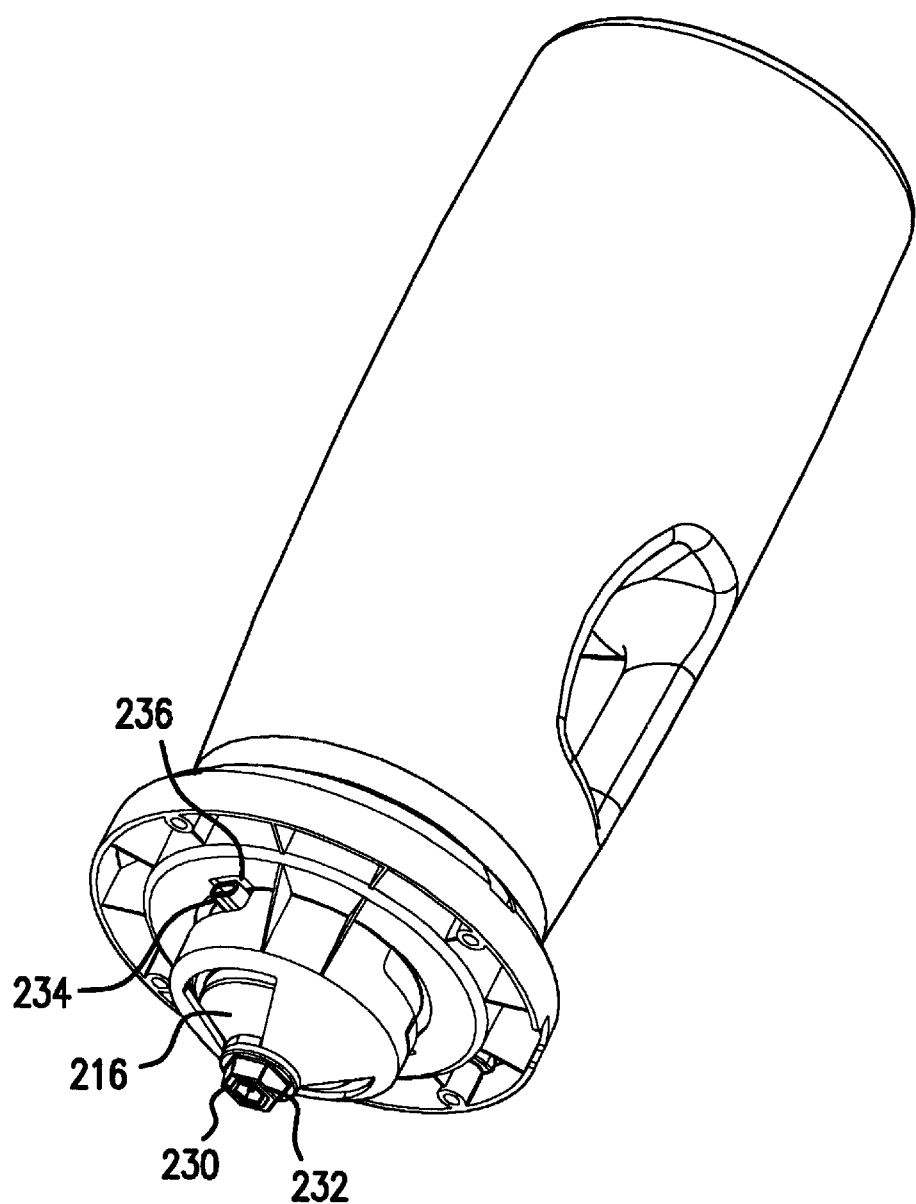
FIG. 13 is a view of the bottle and receptacle insert of FIG. 10 in an insertion/extraction position and orientation.
Figure 14:
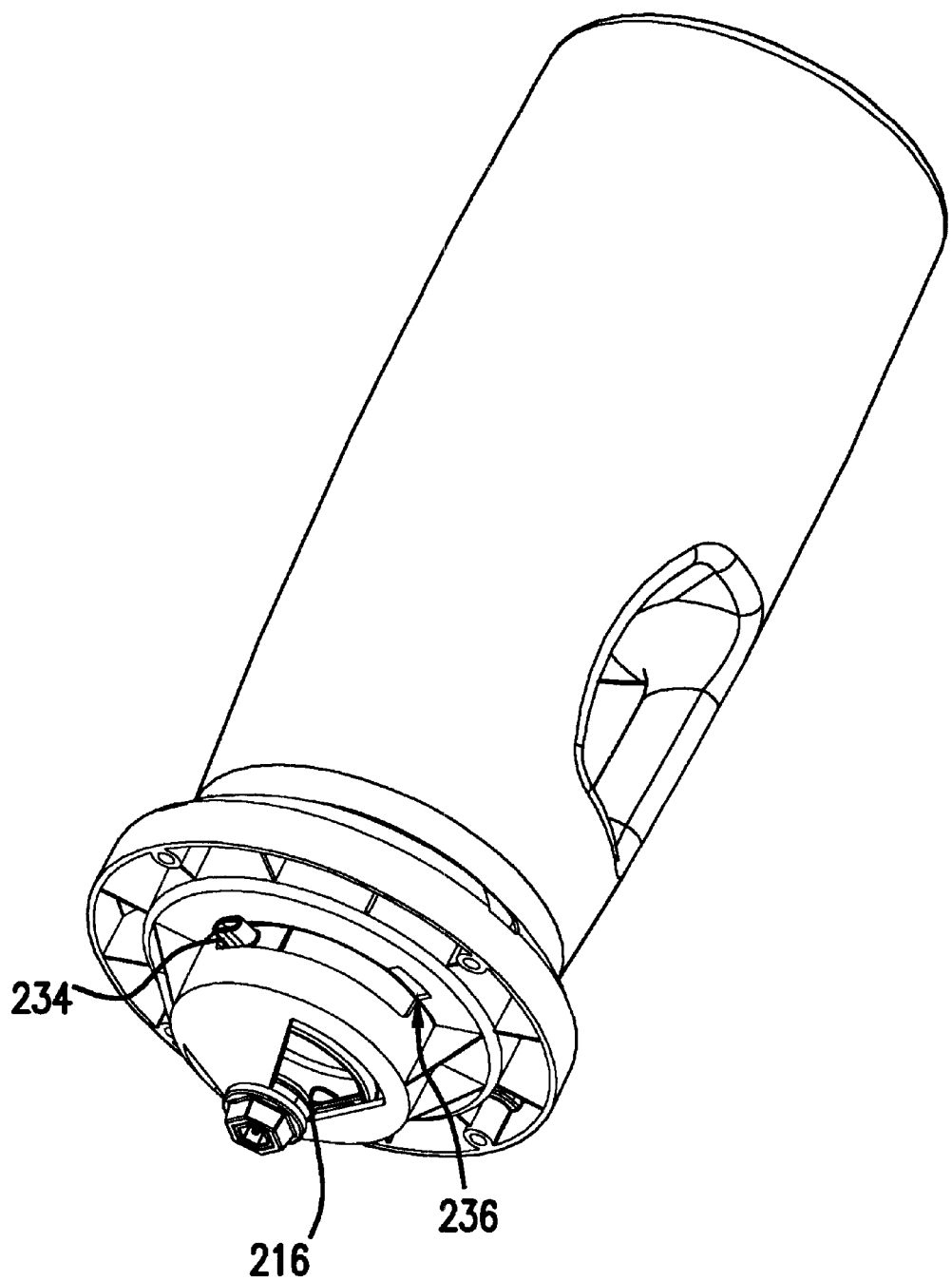
FIG. 14 is a view of the bottle and receptacle insert of FIG. 10 in a locked installed orientation.

With the adapter secured to the bottle, the bottle/adapter assembly may be installed in the feeder via inserting the adapter into an associated cover receptacle. In an initial insertion stage, the adapter is aligned coaxially with the receptacle and then inserted via a substantially longitudinal translation to a second relative position (FIG. 13) which defines an insertion/extraction orientation. The insertion causes features of the adapter to engage features of the receptacle. For example, a multifaceted (e.g., hexagonal nut-like) feature 230 at the apex of the gate may be received by a complementary feature 232 molded into the center of the receptacle. Additionally, bayonet-like lugs (e.g., two diametrically opposed lugs 234) on the adapter/valve body 211 may be received in corresponding channels 236 of the receptacle. Such a bayonet fitting-like interaction allows the bottle and adapter body to be rotated into a locked orientation (FIG. 14, e.g., by about 85° around the axis 520) in which the bottle may not be directly extracted from the receptacle. During such rotation, engagement of the multifaceted feature with the receptacle restrains absolute rotation of the gate, thereby producing a relative rotation of the gate and valve/adapter body, so as to open the valve and permit the chemical to begin to gravity feed into the hopper. Accumulated material in the hopper may initially interrupt such gravity feed. Ultimately, however, as material feeds from the hopper into the body of water, further material may feed from the bottles into the hopper until the bottles are empty.

Optionally the valve and bayonet lug may be integrated with the bottle mouth to avoid a separate adapter.

Advantageously, the bottles are translucent or transparent or include translucent or transparent portions effective to allow a user to see the level of chemical in the bottles and determine whether the bottles are empty. When the bottles are empty, the user may rotate the bottles from the locked installed orientation to an insertion/extraction orientation, closing the valve and permitting the bottle to be removed (e.g., linearly extracted). The adapter may then be removed from the bottle and installed on a fresh full bottle for reinstallation.

Figure 15:
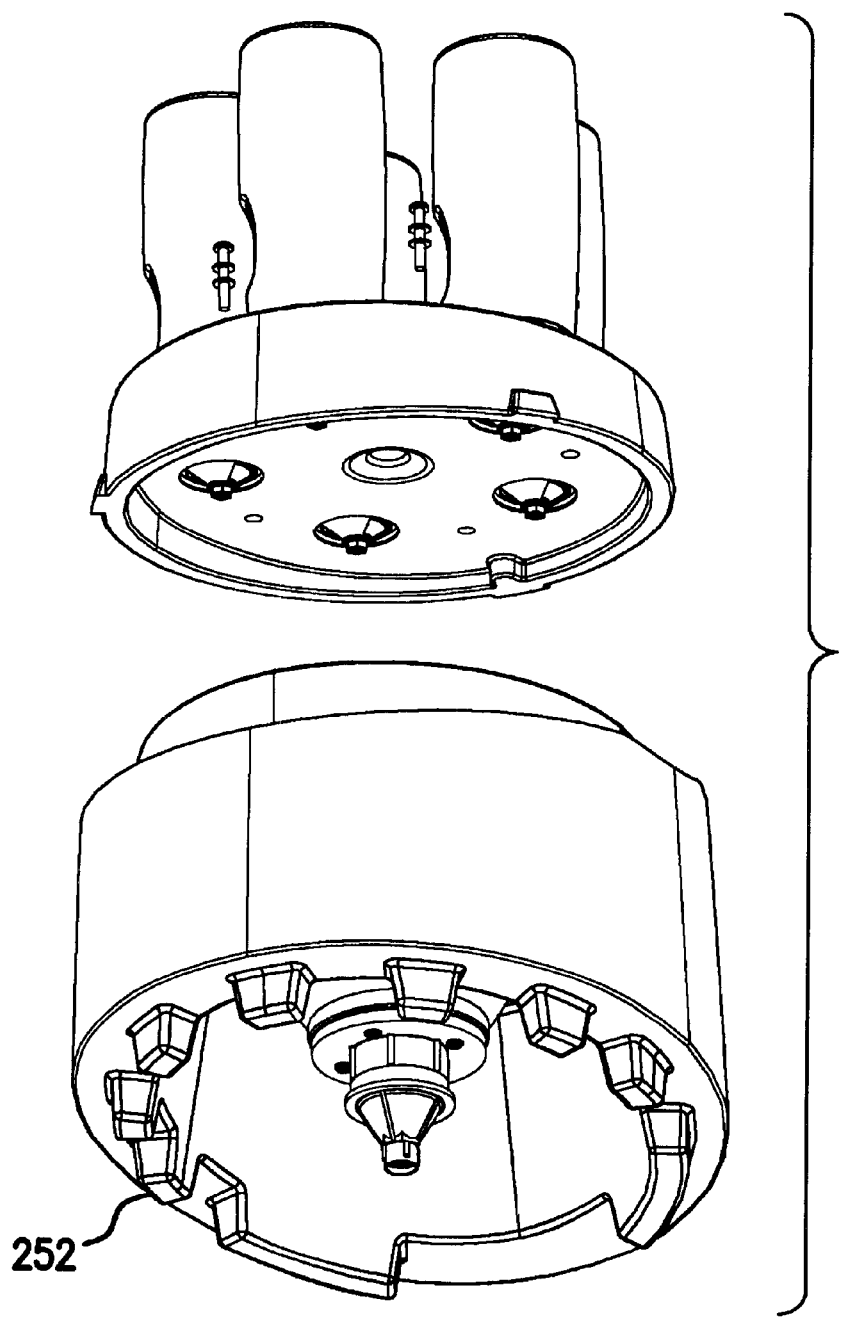
FIG. 15 is a partially exploded perspective view of a dispensing portion of the feeder of FIG. 2 with a hopper cover assembly exploded above a hopper body.

The exemplary hopper preferably includes a primary one-piece molded structural member (e.g., rotomolded). The exemplary dissolving portion also includes such a principal molded member or feeder body. The hopper and body may have interfitting features to allow the hopper to be placed atop the body and retained in a desired fixed position and, preferably, orientation. A number of features are possible including simple complementary internal and external shoulders. However, it is advantageous to ventilate the dissolving chamber. Accordingly, the exemplary body is provided with an internal shoulder 250 (FIG. 9) around a rim of the dissolving chamber. Rather than having a full annulus for engaging the internal shoulder, the hopper provides an interrupted annular interface in the form of a plurality of depending feet 252 (FIGS. 9 and 15) (e.g., as formed by an inverted series of crenellations). The feet may elevate a portion of the hopper outboard thereof slightly above an adjacent rim of the body and permit air to communicate between the feet from the interior of the dissolving chamber headspace to the external environment. This may help reduce humidity above the dissolving chamber and may help reduce agglomeration of material on or around the discharge valve of the hopper.

Figure 16:
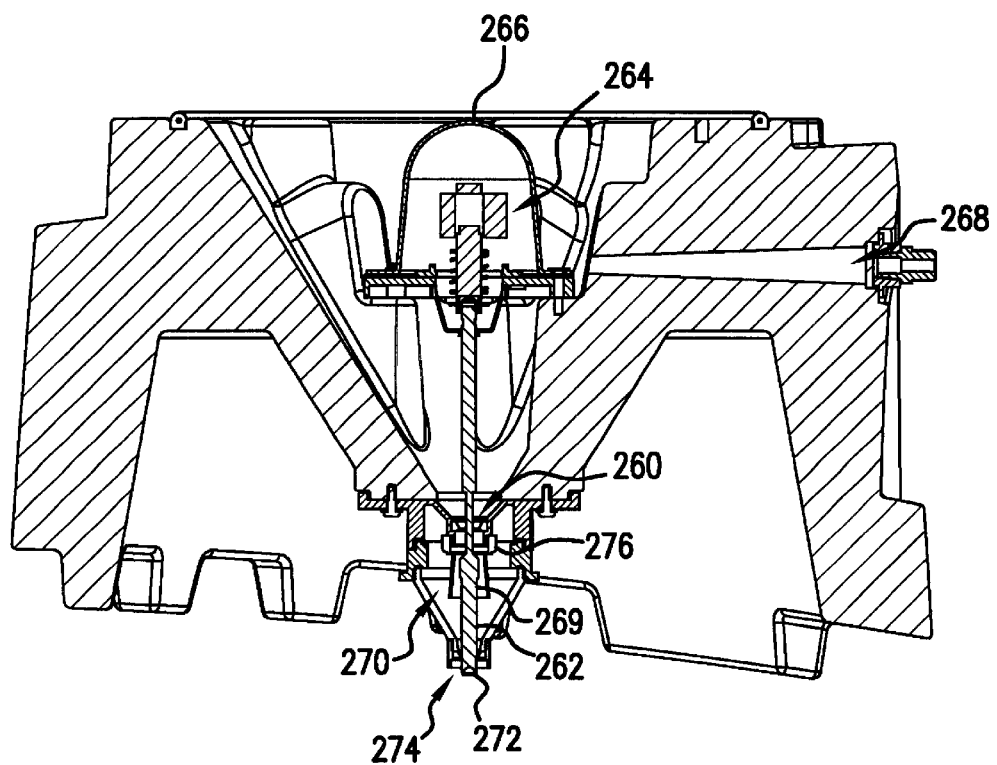
FIG. 16 is a central longitudinal section of the hopper body of FIG. 15 with a hopper outlet valve plunger in an extended position.
Figure 17:
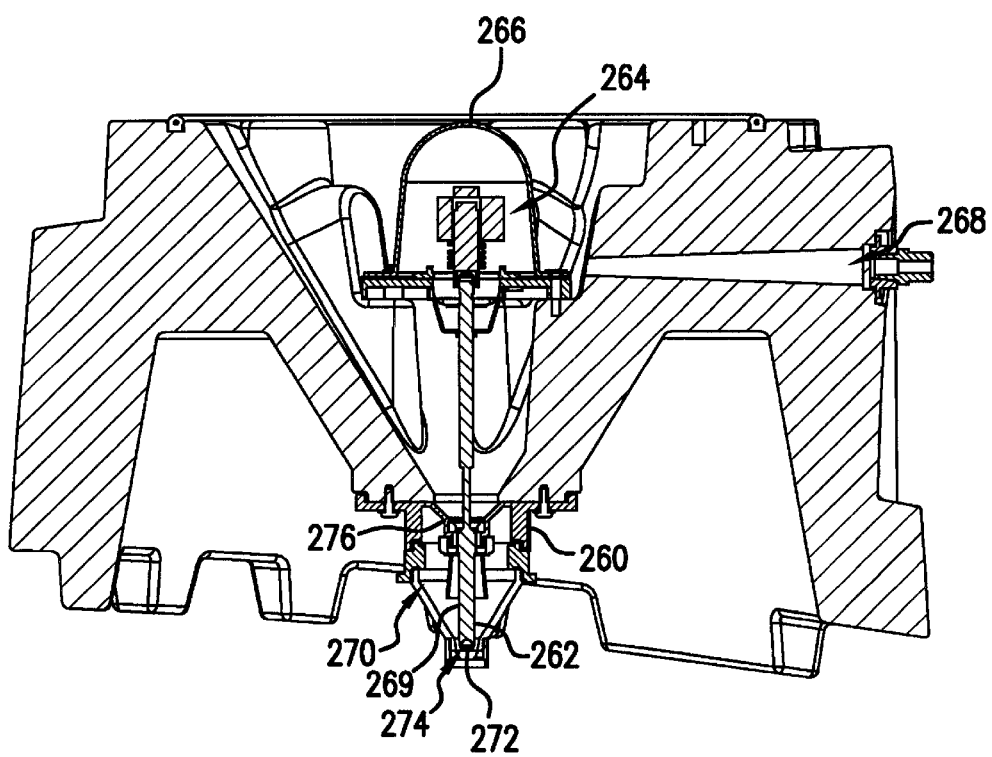
FIG. 17 is a view of the dispensing portion of FIG. 16 with the plunger in a retracted position.

FIG. 16 shows further details of the hopper with a hopper outlet 260 selectively closed by a plunger 262 driven by a solenoid mechanism 264 mounted within the hopper. The solenoid mechanism 264 is protected by a cover 266 and is driven via wires (not shown) passing through a channel 268 in the hopper. The plunger includes an elongate end protuberance 269 extending within a transfer chamber 270 immediately below the hopper outlet 260. A lower (downstream) end 272 of the protuberance is located proximate an outlet 274 of the transfer chamber. With the plunger in a relatively retracted (elevated) position such as shown in FIG. 17, the upper (upstream) end 276 of the protuberance substantially closes the hopper outlet 260 so as to prevent material from falling from the hopper into the transfer chamber. In this position, any material in the transfer chamber may fall through its outlet 274 into the water below. In an extended (lowered) plunger position (FIG. 16), the lower end portion of the protuberance seals the transfer chamber outlet 274 whereas the upper end 276 is sufficiently below the hopper outlet 260 that there is clearance between a relatively narrow plunger neck and the outlet to permit material to fall from the hopper into the transfer chamber so as to fill the transfer chamber with a predetermined amount or shot of chemical material. When the plunger is retracted again, this shot is permitted to fall into the water in the dissolving chamber. When the material falls into the water, the circulation in the dissolving chamber is effective to facilitate dissolving of the material so that overflow from the dissolving chamber contains substantially dissolved material.

In one alternate installation, the booster pump 34 is eliminated from the line 36 extending between the valve 40 and the venturi 62. To induce a diversion flow from the line 28, an additional valve (not shown) is placed in the line 28 between its junctions with the lines 36 and 42. A partial closure of this additional valve creates a pressure difference between the lines 36 and 42, thereby diverting water through the venturi and inducing flow through the lines 52 and 60 as before. This configuration would likely operate the feeder at a lower pressure than the embodiment of FIG. 1. For example, the pressure difference across the additional valve could be in the order of 10–15 psi (70–100 KPa). Appropriate scaling of the other hardware would compensate for the reduced pressure operation. An advantage of such a system is the simplicity of installation by eliminating the electrical installation associated with a booster pump.

One or more embodiments of the present invention have been described. Nevertheless, it will be understood that various modifications may be made without departing from the spirit and scope of the invention. For example, there may be manifold physical implementations of the basic functional principles which have been outlined. Various manufacturing considerations may influence the form taken by any production feeder. Use in applications beyond swimming pools (e.g., industrial applications) is possible as is use in dispensing a variety of chemicals (e.g., sodium bisulfate useful for control of pH levels). Accordingly, other embodiments are within the scope of the following claims.

What is claimed is:

1. A device for introducing a chemical into a flow of water comprising:
   a first chamber;
   at least a first nozzle directing water from the flow into the first chamber so as to produce a vortex flow of a body of water in the first chamber;
   a second chamber;
   a surface separating the first chamber from the second chamber defining an outlet for overflow from the first chamber to the second chamber;
   a second chamber outlet for directing water from the second chamber; and
   a reservoir of the chemical, having a reservoir outlet positioned to direct the chemical from the reservoir into the body of water in the first chamber, whereby the dissolving of the chemical in the water in the body is encouraged by the vortex flow and the water containing the dissolved chemical is evacuated through the second chamber outlet.

2. The device of claim 1 further comprising:
   at least a second nozzle directing water from the flow toward a bottom of the first chamber so as to provide a flushing action at the first chamber bottom; and
   at least a third nozzle bypassing the first chamber and directing additional water from the flow toward the second chamber outlet so as to provide a flushing action at the second chamber outlet.

3. The device of claim 2 further comprising:
   a first float valve controlling flow through the first, second, and third nozzles and positioned to restrict flow when a second chamber water level exceeds a first height; and
   a second float valve controlling flow through the second chamber outlet and positioned to restrict flow when the second chamber water level falls below a second height, lower than the first height.

4. The device of claim 3 wherein:
   the first, second, and third nozzles respectively are formed as first, second, and third flat fan nozzles; and
   the first and second nozzles are fed by a common conduit extending along a majority of flow lengths from said first float valve to said first and second nozzles.

5. The device of claim 1 wherein the surface is formed as a reduced height portion of a rim of a wall separating the first chamber from the second chamber and wherein the first nozzle directs the water substantially tangential to an inner surface of the wall.

6. The device of claim 1 in wherein the chemical consists essentially of calcium hypochlorite, dichloroisocyanuric acid, trichloroisocyanuric acid or combinations thereof.

7. The device of claim 6 wherein the water flow is a recirculating flow to/from a swimming pool and the chemical consists essentially of granular calcium hypochlorite.

8. The device of claim 1 wherein the first nozzle has dimensions effective to carry a water flow rate of between 0.2 gpm and 1.0 gpm (0.8 and 3.8 liters/minute) at 40 psi (0.28 MPa).

9. The device of claim 1 wherein the first nozzle has dimensions effective to carry a water flow rate of between 0.6 gpm and 0.9 gpm (2.3 and 3.4 liters/minute), at 40 psi (0.28 MPa).

10. The device of claim 1 wherein the reservoir comprises:
    a hopper positioned above the body of water;
    an electrically-operated valve regulating discharge of the chemical from the reservoir outlet;
    a cover above the hopper and having a plurality of receptacles and associated ports; and
    a plurality of containers, each such container nondestructively removable coupled to an associated one of the receptacles and having an interior and a port, the port being positioned when so coupled so as to permit gravity feed of the chemical from the interior through the container port and the associated receptacle port at least with the container in a first installed condition.

11. The device of claim 10 wherein the reservoir further comprises:
    a plurality of adapters, each coupling an associated one of the containers to the associated receptacle and nondestructively removably secured to such associated container and receptacle.

12. The device of claim 11 wherein:
    each container has an externally-threaded mouth and the associated adapter has a complementary internally-threaded portion for coupling thereto; and
    each adapter comprises a rotary gate valve with a gate having closed and open orientations respectively permitting and restricting flow of the chemical from the associated container when coupled thereto.

13. The device of claim 12 wherein:
    each adapter comprises an actuator for rotating such adapter's gate between the open and closed conditions;
    each receptacle includes first engagement surfaces, complementary to associated second engagement surfaces of the associated actuator and positioned so that: with the adapter coupled to the associated container, such container/adapter assembly may be inserted into initial engagement with the associated receptacle and then rotated into said first installed condition, the first engagement surfaces of the receptacle restraining rotation of the associated valve gate so that such rotation of the assembly places the gate valve in its open condition;
    each gate includes a frustoconical portion; and
    each receptacle includes third engagement surfaces, complementary to fourth engagement surfaces of the adapter and positioned so that when the container/adapter assembly is in its first installed condition, engagement between the third and fourth engagement surfaces prevents longitudinal extraction of the assembly from the receptacle.

14. The device of claim 1 wherein:
the first and second chambers are formed in a lower housing consisting essentially of a one-piece unitarily molded material.

15. The device of claim 1 wherein:
the first and second chambers are formed in a lower housing;
the reservoir comprises a hopper positioned above the body of water and formed in an upper housing;
the lower housing has an internal shoulder at least partially circumscribing the first chamber and having an upward-facing shoulder surface;
the upper housing has a plurality of depending feet, dimensioned to simultaneously engage the shoulder surface and support the upper housing atop the lower housing in an installed condition and provide ventilation paths between the feet.

16. A device for introducing chlorine from a chlorine containing pool treatment chemical into a flow of water to/from a swimming pool comprising:
a feeder inlet receiving water from the flow;
a chamber and a chamber wall having lateral and bottom portions;
a first nozzle directing received water into the chamber so as to produce a vortex flow of a body of water in the chamber;
an opening above a surface of the vortex flow for receiving amounts of the chlorine containing pool treatment chemical from a reservoir of such chemical;
a chamber outlet on said wall lateral portion guiding chlorine containing water out of the chamber; and
a feeder outlet returning said chlorine containing water to the flow.

17. A pool water treatment system comprising:
the device of claim 1;
at least one pump;
a filter; and
a conduit network coupling the device, pump, and filter to a swimming pool for filtering and chlorinating a recirculating a flow of water to/from the pool.

18. The system of claim 17 including an electronic controller controlling operation of at least the reservoir of the device.

19. A device for introducing chlorine from a chlorine-containing pool treatment chemical into a flow of water to/from a swimming pool comprising:
an inlet receiving water from the flow;
a chamber;
a nozzle directing received water into the chamber so as to produce a vortex flow of a body of water in the chamber;
an opening above a surface of the vortex flow for receiving amounts of the chlorine-containing pool treatment chemical from the reservoir of such chemical; and
an outlet returning chlorine-containing water to the flow.

20. A device for introducing chlorine from a chlorine-containing pool treatment chemical into a flow of water to/from a swimming pool comprising:
a feeder inlet receiving water from the flow;
a chamber and a chamber wall having lateral and bottom portions;
a first nozzle directing received water into the chamber so as to produce a vortex flow of a body of water in the chamber;
an opening above the vortex flow for receiving amounts of the chlorine-containing pool treatment chemical from a reservoir of such chemical;
a chamber outlet on said wall lateral portion guiding chlorine-containing water out of the chamber; and
a feeder outlet returning said chlorine-containing water to the flow,
wherein said nozzle is a first nozzle which directs its water substantially tangential to an inner lateral surface of the chamber wall and further comprising a second nozzle directing received water into the chamber so as to produce a flow scouring the bottom of the chamber to prevent residue buildup.

21. A device for introducing chlorine from a chlorine-containing pool treatment chemical into a flow of water to/from a swimming pool comprising:
an inlet receiving water from the flow;
a clamber;
a nozzle directing received water into the chamber so as to produce a vortex flow of a body of water in the chamber;
a reservoir of chlorine-containing pool treatment chemical comprising:
a hopper positioned above the body of water; and
an electrically-operated valve regulating discharge of the chemical from the hopper; and
an outlet returning chlorine-containing water to the flow.

22. A method for introducing a treatment chemical into a body of water at a controlled rate comprising the acts of:
providing a feeder having an inlet, an outlet, and containing a solid chemical in a chemical reservoir;
causing a flow of water from the body to enter the feeder through the inlet and exit through the outlet to return to the body;
directing a first portion of the flow into a first chamber of the feeder with a tangential velocity component effective to produce a vortex of said water in the first chamber;
dispensing said chemical from said reservoir into said water in said vortex;
permitting the dispensed chemical to dissolve in the water in the vortex;
permitting an overflow of water and dissolved chemical from said vortex into a second chamber;
permitting said overflow to pass through said outlet; and
directing a second portion of the flow through a conduit bypassing the first chamber so as to provide a flushing action at an outlet of the second chamber optionally coincident with the feeder outlet.

23. The method of claim 22 further comprising:
directing a third portion of the water from into the first chamber so as to produce a flow scouring the bottom of the chamber to prevent residue buildup.

24. The method of claim 23 wherein the overflow represents between 50 and 90 percent of a total flow through the feeder.

25. The method of claim 22 wherein:
the dispensing occurs at a regular interval.

26. The method of claim 22 wherein:
the flow is continuous and the dispensing is intermittent; and
the vortex is produced by introducing at least a portion of the flow to the chamber with a tangential velocity component of at least 30 fps (9 m/s) at a location at least 1 inch (2.5 cm) from a central axis of the chamber.

27. The method of claim 22 wherein the dispensing under the control of an electronic controller.

28. An adaptor for mating a chemical container to a bayonet fitting receptacle of a chemical feeder, comprising:
   a body extending along a central axis between first and second ends and having:
      an internally-threaded portion proximate the first end for coupling the adaptor to a complementary externally-threaded mouth of the container; and
      at least one radial projection for coupling to the bayonet fitting receptacle;
   a rotary gate, rotatably mounted to the body for rotation about said central axis through a plurality of orientations including closed and open orientations respectively permitting and restricting flow of the chemical from the associated container when coupled thereto; and
   an actuator and having engagement surfaces and coupled to the gate proximate the second end so that rotation of the actuator relative to the body rotates the gate about the central axis.

29. A method for introducing a treatment chemical into a flow of water comprising:
   providing a feeder having an inlet, an outlet, and having a hopper for containing a solid chemical received from at least one cartridge;
   causing a flow of water from the body to enter the feeder through the inlet and exit through the outlet to return to the body;
   dispensing said chemical from said hopper into said flow of water;
   directing a combined flow of water and dissolved chemical to said outlet; and
   replenishing the solid chemical in the hopper by:
      removing a spent such cartridge from a receptacle on the feeder;
      installing a replacement cartridge to the receptacle by:
         an insertion along an axis; and
         a rotation about said axis, the rotation opening a valve to establish communication from the replacement cartridge to permit flow of chemical from the replacement cartridge to the hopper.

30. The method of claim 29 wherein:
   said replenishing comprises:
      removing an adapter from the removed spent cartridge, the adapter including the valve; and
      installing said adapter or an interchangeable adapter on said replacement cartridge, the installed adapter including the valve; and
   said rotation is from a first orientation to a second orientation wherein a cooperation of lugs of the installed adapter with surfaces of the receptacle prevents withdrawal of the installed cartridge along said axis.

31. A device for introducing chlorine from a chlorine-containing pool treatment chemical into a flow of water to/from a swimming pool comprising:
   a feeder inlet receiving water from the flow;
   a chamber and a chamber wall having lateral and bottom portions;
   a first nozzle directing received water into the chamber so as to produce a vortex flow of a body of water in the chamber;
   an opening above the vortex flow for receiving amounts of the chlorine-containing pool treatment chemical from a reservoir of such chemical;
   a chamber outlet on said wall lateral portion guiding chlorine-containing water out of the chamber; and
   a feeder outlet returning said chlorine-containing water to the flow,
wherein said chamber is a first chamber and the device further comprises a second chamber and wherein said chamber outlet comprises a reduced height portion of a rim of said chamber wall separating the first chamber from the second chamber and wherein the feeder outlet directs said chlorine-containing water to the flow from said second chamber.

* * * * *